June 20, 1967  W. E. KLUND ETAL  3,327,062
MULTIPLEX DELAY LINE TIME COMPRESSOR
Filed March 20, 1964  3 Sheets-Sheet 1

INVENTORS
WILLIAM E. KLUND
ROBERT D. ISAAK
BY
ATTORNEYS

June 20, 1967    W. E. KLUND ETAL    3,327,062
MULTIPLEX DELAY LINE TIME COMPRESSOR
Filed March 20, 1964    3 Sheets-Sheet 3

INVENTORS
WILLIAM E. KLUND
ROBERT D. ISAAK
BY
ATTORNEYS

United States Patent Office 3,327,062
Patented June 20, 1967

3,327,062
MULTIPLEX DELAY LINE TIME COMPRESSOR
William E. Klund and Robert D. Isaak, San Diego, Calif., assignors to the United States of America as represented by the Secretary of the Navy
Filed May 20, 1964, Ser. No. 369,038
9 Claims. (Cl. 179—15)

The invention described herein may be manufactured and used by or for the Government of the United States of America for governmental purposes without the payment of any royalties thereon or therefor.

The instant invention relates to a multiplex delay line time compressor and more particularly to a multiplex delay line time compressor in which a given pattern is repeated an integral number of times before a new sample is added.

The prior art delay line time compressor (hereinafter referred to as a deltic) such as that disclosed by V. C. Anderson in Patent No. 2,958,039, filed Oct. 25, 1960, utilizes a delay line for storage which has a predetermined length for storing a predetermined number of sample signals. With each new sample of information which is added thereto, the oldest sample of stored information is removed by an inhibit gate to make room for the new sample of information. By its very nature, one given pattern of stored signals is thus seen only once at any given point in its recirculating loop and hence can only be utilized for correlation purposes once.

It has become necessary in correlation systems where multiple correlation techniques are utilized, i.e. more than one predetermined pattern is to be correlated, to shorten the basic deltic recirculation period to the point where several circulations take place before any new sample of information is introduced, and the oldest sample removed. To insure an even or odd integral number of circulations plus or minus one bit between each insertion of a new signal sample, a precise relationship between sampling period and recirculation period is required to negative any possibility of fractional circulation and hence the destruction of the original order of information pulses in the system.

Generally, this is accomplished by effectively elongating the stored information recirculating loop by one bit length for one recirculation of the stored information every time a new sample is taken. The number of correlator channels in a given system is thus substantially reduced by this "multiplex" operation so that a single correlator which utilizes multiplex deltics is capable of handling several input signals on a sequential basis rather than just a single input signal.

To restate the basic principle, in the ordinary or simplex deltic, the stored information in the memory loop circulates one rotation, plus or minus one bit, as each succeeding new sample is inserted into the memory loop. The operation of a multiplex deltic is similar except that the stored information is permitted to circulate an integral number of rotations plus or minus one bit as each succeeding new sample is inserted. The integral part of the number of rotations per inserted sample is the multiplicity factor of the multiplex deltic. The multiplicity factor in this sense is equal to the redundancy factor of the deltic output signal, the number of times the time compressed replica of the input signal appears at the output during the interval between insertion of successive new samples. Because of this redundancy in the output, it is possible for the correlator to perform multiple serial correlations instead of a single correlation during the sampling interval.

It is an object of the present invention to provide a multiplex deltic which repeats its output pattern an integral number of times before a new sample is inserted.

Another object is the provision of a multiplex deltic in which precessing is accurately controlled.

A further object of the invention is the provision of a multiplex deltic utilizing standard logic circuitry.

Still another object is to provide a multiplex deltic which is compact, simple and requires a minimum of maintenance and adjustment.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
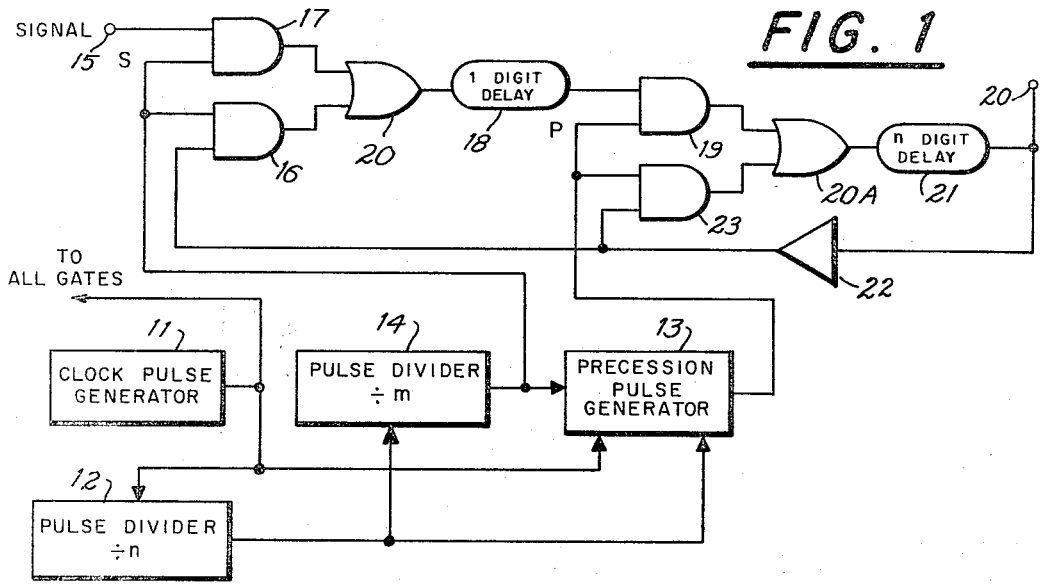
FIG. 1 is a block diagram of one embodiment of the present invention.

Referring to drawings, in FIG. 1 clock pulse generator 11 has an output connected to pulse divider 12 and precession pulse generator 13. The output of pulse divider 12 is connected to pulse divider 13, the output of which is connected to precession pulse generator 13, inhibit gate 16, and AND gate 17.

Input terminal 15 is connected to another input of AND gate 17, the output of which is connected through delay line 18 to one input of AND gate 19. The output of inhibit gate 16 is also connected to the input of delay line 18. Delay line 21 has an output connected through amplifier 22 to the inhibit inputs of inhibit gates 23 and 16. The output of precession pulse generator 13 is connected to the inhibit input of inhibit gate 23 and to the enabling input of AND gate 19. The outputs of AND gate 19 and inhibit gate 23 are connected to input of delay line 21.

Figure 2:
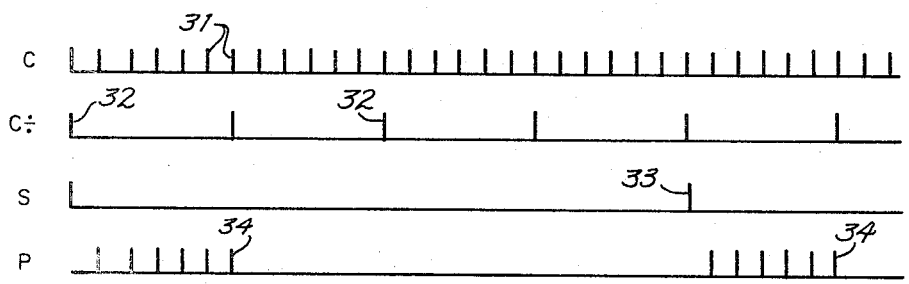
FIG. 2 is a series of waveforms which appear throughout the block diagram of FIG. 1.

Referring to FIG. 2, clock pulses 31 appear at the output of clock pulse generator 11 of FIG. 1, clock divided by $n$ pulses 32 appear at the output of pulse divider 12 sample pulses, clock divided by $(n \times m)$, 33 appear at the output of pulse divider 14 and precession pulses 34 appear at the output of precession pulse generator 13 in FIG. 1.

Figure 3:
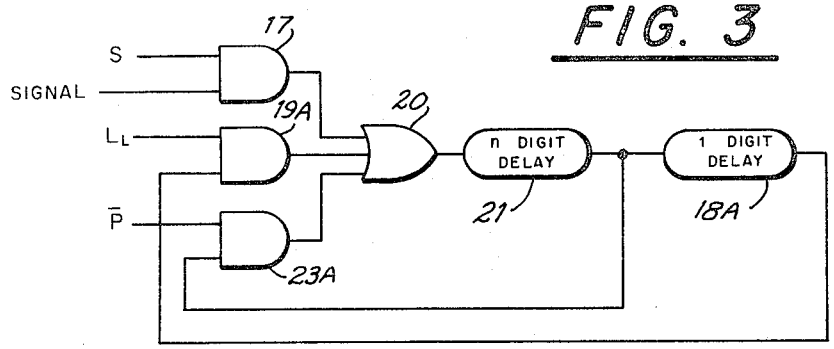
FIGS. 3, 4 and 5 are block diagrams of other embodiments of the present invention.
Figure 4:
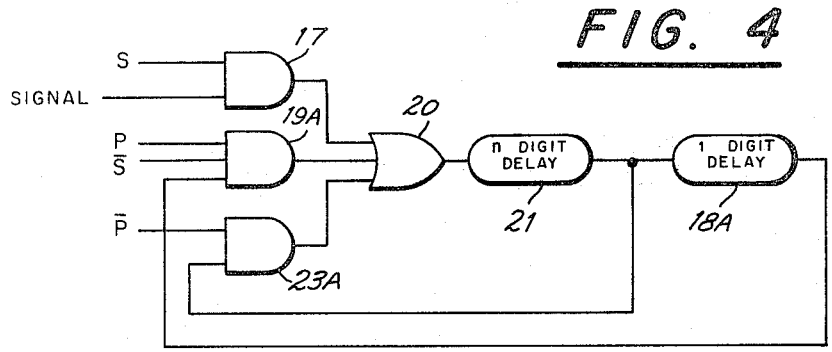

FIGS. 3 and 4 are identical to FIG. 1 with the exception that delay line 21 is connected through delay line 18a to AND gate 19a instead of through inhibit gate 16 (FIG. 1). Also the output of AND gate 17 is connected through OR gate 20 directly to the input of delay line 21 instead of through delay line 18 (FIG. 1). Another output of delay line 21 is connected to inhibit gate 23a.

Figure 5:
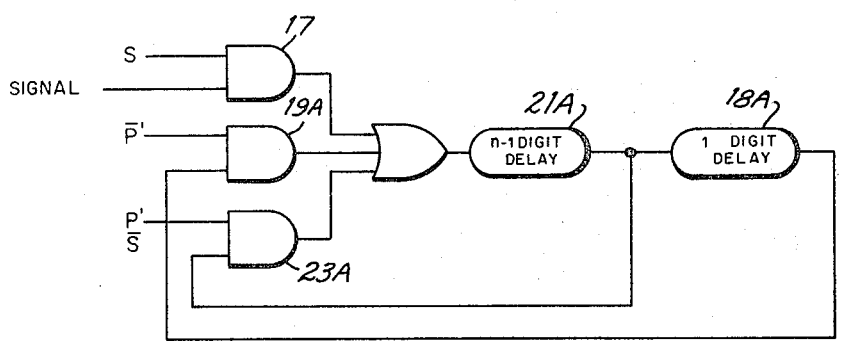
Figure 6:
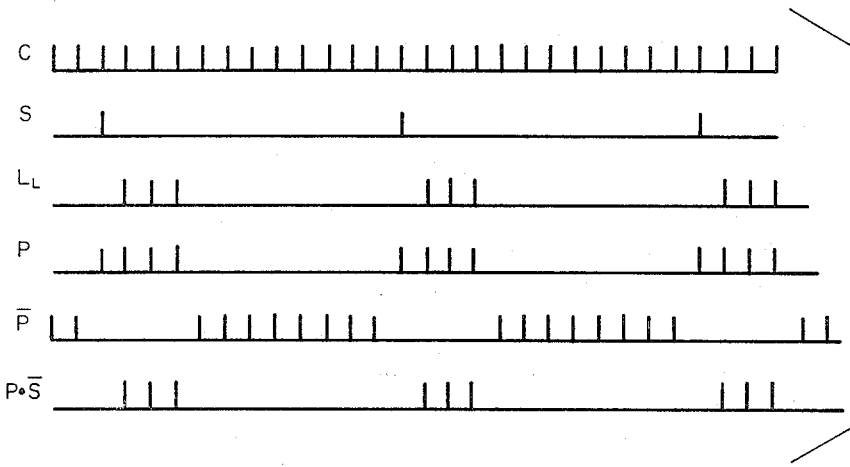
FIG. 6 illustrates the waveforms seen throughout the block diagrams of FIGS. 3 and 4.
Figure 7:
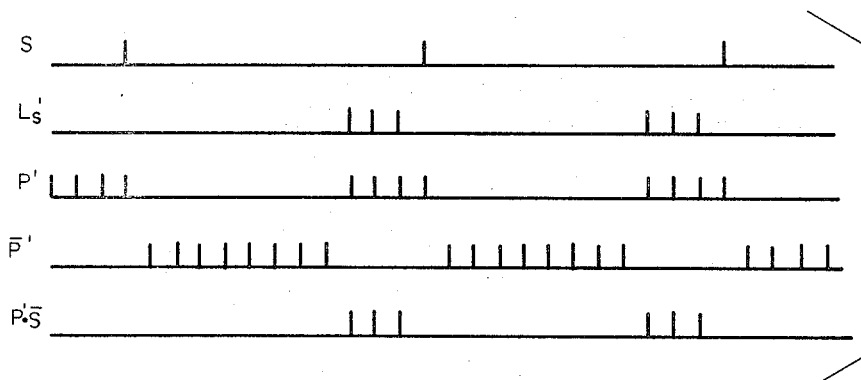
FIG. 7 illustrates the waveform seen throughout the block diagram of FIG. 5.

FIGS. 6 and 7 show the control signals for FIGS. 3, 4 and 5.

Figure 8:
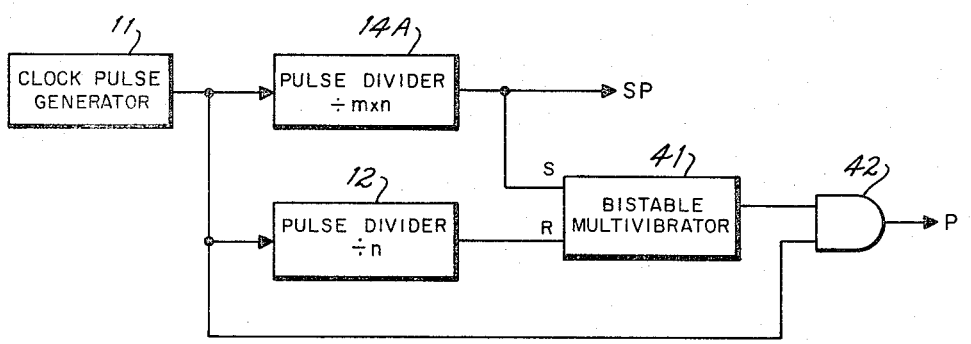

Referring to FIG. 8, a further modification of the systems of FIGS. 1, 3 and 4 is shown which facilitates the implementation of precession pulse generator 13. Here clock pulse generator 11 is shown connected to pulse divider 12 and also connected to a pulse divider 14a which serves the same function as pulse divider 14 in FIG. 1. The outputs of pulse divider 12 and pulse divider 14a are supplied to bistable multivibrator 41 as reset and set pulses, respectively. The output of bistable multivibrator 41 is connected to one input of AND gate 42 the other input of AND gate 42 being connected to an output of clock pulse generator 11. The output of AND gate 42 is then the output of precession pulse generator 13 of FIG. 1.

Figure 9:
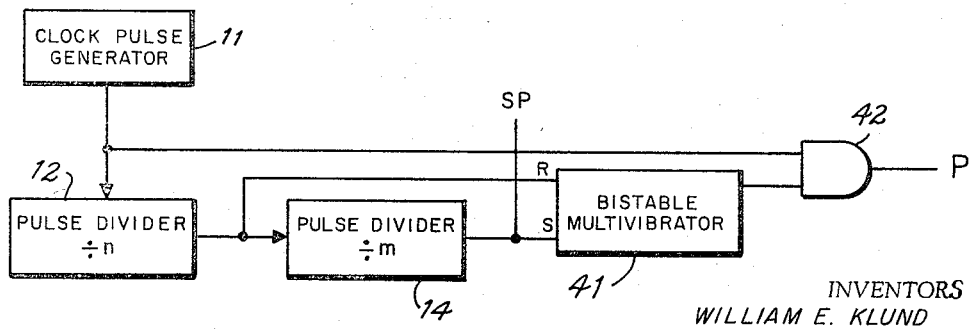
FIGS. 8 and 9 are block diagrams of embodiments of the precession pulse generator of FIG. 1.

Referring to FIG. 9 clock pulse generator 11 is shown connected to pulse divider 12 which, in turn, is connected to pulse divider 14 identically as shown in FIG. 1. The outputs of pulse divider 12 and pulse divider 14 are supplied as set and reset pulses to bistable multivibrator 41 as in FIG. 6, the output of which is connected to one input of AND gate 42. AND gate 42 has another input connected to the output of clock pulse generator 11 as shown in FIG. 5. Components 41 and 42 of both FIGS. 5 and 6 then comprise the precession pulse generator of FIG. 1.

*Operation*

Referring back to FIGS. 1 and 2 clock pulse generator 11 generates the basic timing pulses for the multiplex deltic and all associated equipment. Pulse dividers 12 and 14 each form a short pulse comparable in shape to a single clock pulse, every $n$ clock pulses in the case of pulse divider 12, and every $n$ times $m$ clock pulses in the case of pulse divider 14. This later pulse, i.e. the clock pulse divided by $n$ times $m$, is also known as the sample pulse. The precession pulse generator 13 is activated by the sample pulse, the pulse divided by $n$ from pulse divider 12, and clock pulse generator 11. The method of generation of the precession pulses will be gone into with respect to FIGS. 5, 6 and 7. These pulses comprise a train of clock pulses exactly $n$ in number the first of which follows the sample pulse by 1 clock pulse period.

AND gates 17 and 19 normally block information (in the absence of a sample pulse or precession pulses which enable AND gates 17 and 19, respectively. Inhibit gates 16 and 23 normally pass information in the absence of a sample pulse or an output from precession pulse generator 13, respectively. A sample pulse from pulse divider 14 admits a new bit of information into the memory loop through AND gate 17 and removes the presently oldest recirculating bit through the action of inhibit gate 16. The new bit passes through the one digit delay line 18 through AND gate 19 (since the first precession pulse will now be present to enable AND gate 19) into the $n$ digit delay line 21. The remaining bits currently stored in the $n$ digit delay line are then gated through this same one digit delay line 18 by inhibit gate 16 since there are no further sample pulses from pulse divider 14. They each pass through the one digit delay line 18 once and only once, since there are exactly $n$ precession pulses from precession pulse generator 13 in the train which inhibit gate 23.

In this way each and every stored bit is precessed with respect to the sample pulse, by one clock pulse period. After the precession pulse train has stopped and prior to the next sample pulse, the $n$ stored bits circulate $m-1$ additional times around the short loop composed of the $n$ digit delay line 21 and inhibit gate 23. This sequence of events is repeated when the next sample pulse is present at the input of AND gate 17 and the next signal sample is thereby inserted.

The previously inserted signal sample will circulate and follow the new sample by one digit space. Each new sample will make $m$ circulations through the long memory loop (while precessing) and $n$ circulations through the short loop before it becomes properly timed to be discarded by inhibit gate 16.

The deltic output taken at terminal 20 will be a speeded-up replica, in reverse order in this case, of the $n$ previous signal samples supplied to the deltic. This replica will be repeated $m$ times prior to insertion of the next sample and rejection of the oldest sample. The multiplex deltic therefore has a redundancy factor of $m$.

Referring to FIG. 3 a modification is shown whereby the short memory loop will supply the input of the $n$ digit delay line 21 through inhibit gate 23a when there are no precession pulses at the output of precession pulse generator 13. When the precession pulses in inhibit gate 23a and enable AND gate 19a, the output from the $a$ digit delay line 21 passes through the one digit delay line 18a and AND gate 19a. In this mode of operation the precession pulses start at the same time as the sample pulse instead of one clock pulse period after the sample pulse. This configuration will also result in a retrogressive alignment of information, i.e., the output information will occur in the reverse order of the input information.

Referring to FIG. 4 the only change here from FIG. 3 is that the complement of the sample pulse enables gate 19a (i.e. sample pulse inhibits gate 19a and the precession pulse enables gate 19a with the same result as in FIG. 3).

Referring to FIG. 5 the delay line 21 has been replaced by a delay line 21a which has $n-1$ digits of delay. Here the normal mode of operation, i.e. when there are no precession pulses, is through the long loop, the long loop being from the output of delay line 21a through one digit delay line 18a and gate 19a. This will result in a complete rotation of stored information every $n$ clock pulse periods. When the sample is inserted and gate 19a and gate 23a are inhibited by the first precession pulse, allowing AND gate 17 only to insert one new bit of information. Precession pulses, $n$ in number begin prior to the simple pulse and terminate concurrently with it. These precession pulses enable AND gate 19a and inhibit gate 23a, allowing the information to circulate through the short loop comprised of delay line 21a and AND gate 19a throughout the precession. When the last precession pulse occurs, the concurrent sample pulse again inhibits gate 19a and allows a new bit of information to be passed through AND gate 17 followed by the remaining bits through the long memory loop comprising one digit delay line 18a and inhibit gate 23a. In this embodiment the output will have the same order of information bits as the input.

FIG. 6 shows the control signals for FIGS. 3, 4 and 5 in which C is the output of a clock pulse generator, S is the clock pulse generator divided by $n$ times $m$, P are the precession pulses, $\bar{P}$ is the complement of P, and $L_L$ is P and $\bar{S}$.

FIG. 7 shows the input pulses to FIG. 5 which is identical to FIG. 6 with the exception that P' comprising $n$ precession pulses has its last pulse coincident with the sample pulse S. The logic is then identical to that in FIG. 6. With the exception that $L_s'$ is equal to P' and $\bar{S}$.

Refering to FIG. 8 one embodiment of the precession pulse generator 13 is shown. Pulse divider 14A supplies a set pulse to flip-flop 41 at the same time as the sample pulse is applied to gate 17 (FIG. 1). Flip-flop 41 then enables AND gate 42 so that the next clock pulse from clock pulse generator 11 will pass through AND gate 42 starting the train of precession pulses shown at 34 at FIG. 2. N clock pulses later, an output is supplied from pulse divider 12, shown as waveform 32 in FIG. 2, to reset bistable multivibrator 41, inhibiting AND gate 42. At this time the train of precession pulses shown at 34 in FIG. 2 will be stopped.

Referring to FIG. 9 the same theory applied except here pulse divider 14 is shown independent of pulse divider 12, the same overall division of clock pulse generator 11 taking place.

It should be understood, of course, that the foregoing disclosure relates to only a preferred embodiment of the invention and that it is intended to cover all changes and modifications of the examples of the invention herein chosen for the purposes of the disclosure which do not

What is claimed is:
1. A multiplex deltic comprising:
   (a) a first pulse generator having an output of pulses at a frequency $f$;
   (b) a second pulse generator having an output of pulses at a frequency $f/n$ where $n$ is an odd or even integer greater than unity;
   (c) a third pulse generator having an output of pulses at a frequency of $f/mn$ where $m$ is an odd or even integer greater than unity;
   (d) first and second AND gates each having a signal input, an enabling input and an output;
   (d¹) first and second inhibit gates each having a signal input, an inhibit input, and an output;
   (e) a first delay means having an input and an output, said first delay means input connected to said first AND gate output and said first inhibit gate output, said first delay means output connected to said second AND gate signal input said first delay means having a time delay of a period $1/f$;
   (f) a precession pulse generator having first, second and third inputs connected to the outputs of said first, second and third pulse generating means, respectively, and an output of $n$ pulses at a frequency of $f$, said $n$ pulses occurring once in each period of $1/nm$;
   (g) a second delay means having a total delay of $n/f$, and having an input and an output, said second delay means output connected to said first and second INHIBIT gate signal inputs, said second delay means input connected to said second AND gate output and said second INHIBIT gate output;
   (h) the output of said third pulse generating means connected to the enabling input of said first AND gate and the inhibit input of said first INHIBIT gate; and
   (i) the output of said precession pulse generator connected to the enabling input of said second AND gate and the INHIBIT input of said second INHIBIT gate;
   (j) the signal input of said first AND gate being adapted for connection to a signal of interest;
   (k) whereby all of the signal samples from said first AND gate will circulate $n$ times through said second delay means between each new signal sample.

2. The multiplex deltic of claim 1 whereby said precession pulse generator comprises a bistable multivibrator having a set input connected to said third pulse generating means output and a reset input connected to said second pulse generating means output, said multivibrator having an output; and
   an AND gate having a signal input, an enabling input and an output, said signal input connected to said first pulse generating means output and said enabling input connected to said multivibrator output.

3. The multiplex deltic of claim 1 whereby said second and third pulse generating means each comprise a pulse divider operatively connected to the output of said first pulse generating means.

4. A multiplex deltic comprising:
   (a) a first pulse generating means having an output of pulses at a frequency $f$;
   (b) a second pulse generating means having an output of pulses at a frequency $f/n$ where $n$ is an odd or even integer greater than unity;
   (c) a third pulse generating means having an output of pulses at a frequency of $f/mn$ where $n$ is an odd or even integer greater than unity;
   (d) first and second AND gates each having a signal input, an enabling input and an output;
   (d¹) an inhibit gate having a signal input, inhibit input, and an output;
   (e) a first delay means having an input and an output, said first delay means output connected to said second AND gate signal input, said first delay means having a time delay of a period $1/f$;
   (f) a precession pulse generator having first, second and third inputs connected to the outputs of said first, second and third pulse generating means, respectively, and an output of $n$ pulses at a frequency of $f$, said $n$ pulses occurring once in each period of $1/nm$;
   (g) a second delay means having a total delay of $n/f$, and having an input and an output, said second delay means output connected to said inhibit gate signal input and said first delay means input;
   (h) said second delay means input connected to first and second AND gate output and said inhibit gate output;
   (i) the output of said third pulse generating means connected to the enabling input of said first AND gate and the inhibit inputs of said second AND gate, and
   (j) the output of said precession pulse generator connected to the enabling input of said second AND gate and the inhibit input of said inhibit gate;
   (k) the signal input of said first AND gate being adapted for connection to a signal of interest;
   (l) whereby all of the signal samples from said first AND gate will circulate $n$ times through said second delay means between each new signal samples.

5. The multiplex deltic of claim 4 whereby said precession pulse generator comprises a bistable multivibrator having a set input connected to said third pulse generating means output and a reset input connected to said second pulse generating means output, said multivibrator having an output; and
   an AND gate having a signal input, an enabling input and an output, said signal input connected to said first pulse generating means output and said enabling input connected to said multivibrator output.

6. The multiplex deltic of claim 4 whereby said second and third pulse generating means each comprise a pulse divider operatively connected to the output of said first pulse generating means.

7. A multiplex deltic comprising:
   (a) a first pulse generating means having an output of pulses at a frequency $f$;
   (b) a second pulse generating means having an output of pulses at a frequency $f/n$ where $n$ is an odd or even integer greater than unity;
   (c) a third pulse generating means having an output of pulses at a frequency of $f/mn$ where $m$ is an odd or even integer greater than unity;
   (d) first and second AND gates each having a signal input, an enabling input and an output, said second AND gate having an inhibit input;
   (d¹) an inhibit gate having a signal input, first and second inhibit inputs, and an output;
   (e) a first delay means having an input and an output, said first delay means output connected to said second AND gate signal input, said first delay means having a time delay of a period $1/f$;
   (f) a precession pulse generator having first, second and third inputs connected to the outputs of said first, second and third pulse generating means, respectively, and an output of $n$ pulses at a frequency of $f$, said $n$ pulses occurring once in each period of $1/nm$;
   (g) a second delay means having a total delay of $n/f$, and having an input and an output, said second delay means output connected to said second AND gate signal input and said first delay means input, said second delay means input connected to said first and second AND gate outputs and said inhibit gate output;
   (h) the output of said third pulse generator connected to the enabling input of said first AND gate and to inhibit inputs of said second AND gate and said inhibit gate; and
   (i) the output of said precession pulse generating means connected to the enabling input of said second AND gate and an inhibit input of said second inhibit gate;

(j) the signal input of said first AND gate being adapted for connection to a signal of interest;

(k) whereby all of the signal samples from said first AND gate will circulate $n$ times through said second delay means between each new signal samples.

8. The multiplex deltic of claim 7 whereby said precession pulse generator comprises a bistable multivibrator having a set input connected to said third pulse generating means output and a reset input connected to said second pulse generating means output, said multivibrator having an output; and an AND gate having a signal input, an enabling input and an output, said signal input connected to said first pulse generating means output and said enabling input connected to said multivibrator output.

9. The multiplex deltic of claim 7 whereby said second and third pulse generating means each comprise a pulse divider operatively connected to the output of said first pulse generating means.

References Cited

UNITED STATES PATENTS

| | | | |
|---|---|---|---|
| 3,150,374 | 9/1964 | Sunstein et al. | 179—15 |
| 3,238,298 | 3/1966 | Willis | 179—15.55 |

JOHN W. CALDWELL, *Acting Primary Examiner.*

ROBERT L. GRIFFIN, *Examiner.*